US009266119B2

(12) United States Patent
Ehresmann

(10) Patent No.: US 9,266,119 B2
(45) Date of Patent: Feb. 23, 2016

(54) METHOD AND APPARATUS FOR TRANSPORTING MAGNETIC FLUIDS AND PARTICLES

(75) Inventor: Arno Ehresmann, Zweibruecken (DE)

(73) Assignee: Universitaet Kassel, Kassel (DE)

( * ) Notice: Subject to any disclaimer, the term of this patent is extended or adjusted under 35 U.S.C. 154(b) by 817 days.

(21) Appl. No.: 13/508,094

(22) PCT Filed: Nov. 5, 2009

(86) PCT No.: PCT/EP2009/064719

§ 371 (c)(1),
(2), (4) Date: May 14, 2012

(87) PCT Pub. No.: WO2011/054391

PCT Pub. Date: May 12, 2011

(65) Prior Publication Data

US 2012/0222940 A1 Sep. 6, 2012

(51) Int. Cl.
*B03C 1/02* (2006.01)
*B01D 35/06* (2006.01)
*B03C 3/28* (2006.01)

(52) U.S. Cl.
CPC ... *B03C 3/28* (2013.01); *B03C 1/02* (2013.01); *Y10T 137/0391* (2015.04); *Y10T 137/8593* (2015.04)

(58) Field of Classification Search
CPC .................................. B03C 1/02; B01D 35/06
See application file for complete search history.

(56) References Cited

U.S. PATENT DOCUMENTS 7,760,529 B2 * 7/2010 Fischer et al. .................. 365/35

OTHER PUBLICATIONS

The Chapter I International Preliminary Report on Patentability for PCT/EP2009/064719, dated May 8, 2012.*

European Patent Office, International Search Report for PCT/EP2009/064719 (Aug. 18, 2010).

A. Auge, et al., "Magnetic Ratchet for Biotechnological Applications", Applied Physics Letters, vol. 94, No. 18, 183507 (May 4, 2009).

B.B. Yellen, et al., "Magnetically Driven Assembly of Colloidal Particles Onto Patterned Surfaces", Nanotech 2003, vol. 3, 542-445 (Feb. 2003).

E. Blums, et al., "Some Problems of Mass Transfer in Magnetic Colloids Near a Filtrating Element in High-Gradient Magnetic Separation", International Journal of Heat and Mass Transfer UK, vol. 30, No. 8, 1607-1613 (Aug. 1987).

B.B. Yellen, et al., "Traveling Wave Magnetophoresis for High Resolution Chip Based Separations", Lab on a Chip, vol. 7, No. 12, 1681-1688 (Dec. 2007).

S. Savel'Ev, et al., "Experimentally Realizable Devices for Domain Wall Motion Control", New Journal of Physics, vol. 7, No. 1, 1-11 (Jan. 2005).

European Patent Office, Office Action for European Patent Application 09 755 866.2 (Oct. 13, 2014) (related EP application).

P. Vavassori, et al., "Manipulation at the nano-scale of single magnetic particles via domain walls conduits", Electromagnetics in Advanced Applications, 2009, ICEAA '09 International Conference, published in IEEE Xplore, pp. 837-840 (Sep. 2009).

J. Noguès, I.K. Schuller, "Exchange bias", 192 J. Magnetism & Magn. Mat. 203-232 (1999).

L.E. Helseth, T. M. Fischer, "Paramagnetic beads suiting on domain walls", 67 Phy. Rev E 042401 (2003).

* cited by examiner

*Primary Examiner* — David A Reifsnyder

(57) ABSTRACT

A method of transporting a magnetic fluid (104) or at least one magnetic particle (509, 510). The method comprises the steps of: providing a magnetic layer (102) with an asymmetric re-magnetization property; placing the magnetic fluid (104) or the magnetic particle(s) (509, 510) in the vicinity of the magnetic layer (102) so that they can magnetically interact with the magnetic layer (102); and applying an external magnetic field.

29 Claims, 8 Drawing Sheets

METHOD AND APPARATUS FOR TRANSPORTING MAGNETIC FLUIDS AND PARTICLES

FIELD OF THE INVENTION

The invention relates to a method of transporting a magnetic fluid or at least one magnetic particle with the help of a magnetic layer. Moreover, the invention relates to a method of moving in a predetermined direction a domain wall that separates adjacent magnetic domains in a magnetic layer. Finally, the invention relates to devices for transporting a magnetic fluid or at least one magnetic particle, the devices comprising a magnetic layer.

BACKGROUND OF THE INVENTION

Many different techniques to sort, position, and transport microscopic particles exist currently. For example, particles can be trapped in a high-intensity optical field and transported by moving that field as is disclosed in Mio, C. et al. Rev. Sci. Instrum., 2000, 71, 2196. Other known methods employ electric fields, see e.g. Velev O. et al., Langmuir 1999, 15, 3693. While such methods in general are used for transport across relatively small distances, it is also known to apply holographic maps to transport particles across larger distances, see Liesner J. et al., Opt. Comm. 2000, 185, 77.

From Yellen, B. B. et al., J. Appl. Phys. 2003, 93, 7331, a concept of using topographic magnetic patterns for the transport of individual magnetic or non-magnetic particles is known. The patterns can for example be ellipses or rectangles and the particles are transported by means of superposition of the stray fields of these patterns with external homogeneous or inhomogeneous fields. The known topographic patterns are fabricated from a ferromagnetic material and the shape anisotropy of the patterns induces a defined easy magnetization axis along which the pattern magnetization can be easily switched by low external magnetic fields. In this concept, single superparamagnetic particles may be transported from one topographic pattern to the next. Moreover, as disclosed in Halverson, D. et al., J. Appl. Phys. 2006, 99, 08P504, non-magnetic particles may be transported by exploiting variations in the density of a ferrofluid in a combination of a local stray field and an external field. Since in these concepts usually the size of a magnetic pattern is close to the dimension of the particle to be transported, in some cases this may be too large to transport biomolecules in living cells.

In U.S. Pat. No. 7,760,529 B2 a system for the transport of paramagnetic particles is disclosed, which comprises a magnetic garnet film having a plurality of magnetic domain walls, and a liquid solution on a surface of the magnetic garnet film, wherein the liquid solution includes a plurality of paramagnetic particles. The garnet film is provided with a natural domain pattern, the domain magnetization being perpendicular to the plane of the film. An external field is applied to transport at least a portion of the paramagnetic particles from one magnetic domain wall to another.

The transport of biomolecules by means of superparamagnetic particles to which they are attached is an active field of research. For example, the detection of such particles by magnetoresistive sensors appears promising in biotechnological applications. Baselt D. R. et al. in Biosensors Bioelectron. 1998, 13, 731 used a BARC (bead array counter) sensor to analyze DNA through a defined coupling of beads (functionalized with a receptor molecule) to DNA fragments immobilized on the surface of a sample. Subsequently several different concepts for biosensors based on spin valves (see e.g. Edelstein R. L. et al., Biosensors Bioelectron. 2000, 14, 805), Hall sensors (see e.g. Ejsing L. et al., J. Magn. Magn. Mat. 2005, 293, 677) or magnetoresistive sensors (see Wang. S. et al. J. Magn. Magn. Mat. 2005, 293, 731, 21), as well as some concepts for a guided movement of magnetic particles (see e.g. Gunnarsson K. et al., Adv. Matter, 2005, 17, 1730) have been tested. The inhomogeneous magnetic fields necessary for the transport of the particles have been created by macroscopic external coils and yokes as e.g. disclosed in Bausch A. R. et al., Biophys. J. 1999, 76, 573 or via currents through strip lines as e.g. disclosed in Ferreira H. A. et al., J. Appl. Phys. 2003, 93, 7281. The use of currents in strip lines enabled the control of local inhomogeneous magnetic fields, through which a particle transport may be controlled and a particle positioning achieved.

Schotter J. et al. in IEEE Trans. Mag. 2002, 38, 3365 have disclosed a biosensor chip based on the detection of functionalized magnetic nanoparticles via a magneto resistive sensor. This sensor consists of a spiral sensor strip, extending over a circular area of 75 μm diameter. The area corresponds to the typical area covered by droplets of pen spotted or ink jetted solutions used in modern techniques of biotechnology. Fundamental experiments have also been carried out to manipulate magnetic nanoparticles by currents through strip lines (see e.g. Breszka M., M. et al., J. Biotechnol. 2004, 112, 25) and they have shown that the sensitivity of magneto resistive detection is superior to that of optical detection using fluorescence markers (see also Schotter J. et al., Biosensors Bioelectr. 2004, 19, 1149). It has been shown that the magnetic force exerted on the superparamagnetic particles by currents through strip lines may be used for extremely sensitive bond force measurements of ligand receptor pairs.

Extremely low loading rates have been realized being superior to those in pulling experiments by atomic force microscopes, see Panhorst M. et al., Biosens. Bioact. 2005, 20, 1685. These experiments demonstrate nicely the possibility to integrate magnetic gradient field driven transport with sensing by magnetoresistive sensors.

Problem to be Solved by the Invention

It is an objective of the present invention to provide an improved method of transporting a magnetic fluid or at least one magnetic particle with the help of a magnetic layer and to provide a new method of moving in a predetermined direction a wall that separates adjacent magnetic domains. It is a further objective of the present invention to provide an improved device for transporting a magnetic fluid or at least one magnetic particle, the devices comprising a magnetic layer.

Solution According to the Invention

In one aspect of the invention, the problem is solved by providing a method of transporting a magnetic fluid or at least one magnetic particle, the method comprising the steps of: providing a magnetic layer with an asymmetric re-magnetization property, wherein the asymmetric re-magnetization property is characterized by changes in the magnetization of the magnetic layer due to an external magnetic field being accompanied by motion of a domain wall in the magnetic layer in one or more parts of a magnetization loop of the magnetic layer; placing the magnetic fluid or the at least one magnetic particle in a vicinity of the magnetic layer so that it can magnetically interact with the magnetic layer; and applying an external magnetic field. The problem is also solved by providing a device for transporting a magnetic fluid or at least one magnetic particle, the device comprising a magnetic layer with an asymmetric re-magnetization property, which magnetic layer can magnetically interact with the magnetic fluid or the at least one magnetic particle; and means for applying an external magnetic field to the magnetic layer, wherein the magnetic layer is an exchange bias system.

In another aspect of the invention, the problem is solved by providing a method of transporting a magnetic fluid or at least one magnetic particle, the method comprising the steps of: providing a magnetic layer with pinned magnetic domains; placing the magnetic fluid or the at least one magnetic particle in the vicinity of the magnetic layer so that it can magnetically interact with the magnetic layer; and applying an external magnetic field, wherein the step of applying the external magnetic field comprises a domain wall assisted transport step in which the domain wall moves to transport the magnetic field or the at least one magnetic particle. The problem is also solved by providing a device for transporting a magnetic fluid or at least one magnetic particle, the device comprising a magnetic layer having pinned magnetic domains, which magnetic layer can magnetically interact with the magnetic fluid or the at least one magnetic particle; and means for applying an external magnetic field to the magnetic layer.

In a further aspect of the invention, the problem is solved by providing a method of transporting a magnetic fluid or at least one magnetic particle, the method comprising the steps of: providing a magnetic layer with an artificial pattern of magnetic domains; placing the magnetic fluid or the at least one magnetic particle in the vicinity of the magnetic layer so that it can magnetically interact with the magnetic layer; and applying an external magnetic field, wherein the step of applying the external magnetic field comprises a domain wall assisted transport step in which the domain wall moves to transport the magnetic fluid or the at least one magnetic particle. The problem is also solved by providing a device for transporting a magnetic fluid or at least one magnetic particle, the device comprising a magnetic layer with an artificial pattern of magnetic domains, which magnetic layer can magnetically interact with the magnetic fluid or the at least one magnetic particle; and means for applying an external magnetic field to the device, preferably the magnetic layer, wherein the magnetic layer is an exchange bias system.

In yet another aspect of the invention, the problem is solved by providing a method of transporting a magnetic fluid or at least one magnetic particle by moving in a predetermined direction a domain wall that separates adjacent magnetic domains in a magnetic layer, the method comprising the steps of: applying an external magnetic field to the magnetic layer, a component of the external magnetic field in a plane of the magnetic layer having a gradient at a location of the domain wall; and changing the external magnetic field, thereby moving the domain wall, the step of applying the external magnetic field comprises at least one gradient driven transport step in which the external magnetic field comprises at least one gradient driven transport step in which the external magnetic field applied is a magnetic gradient field and at least one magnetic particle or at least some of the magnetic fluid is moved by a force exerted on it by the magnetic gradient field, wherein, in the gradient driven transport step, the domain wall vanishes.

In some aspects, the invention exploits the fact that the external magnetic field can induce re-magnetization of the magnetic layer. In particular, by means of applying and/or changing the external magnetic field, at least part of the magnetization loop of the magnetic layer can be run through.

In the context of the present invention, “re-magnetization” means that under the influence of the external magnetic field, the magnetization of the magnetic layer changes. The term “asymmetric re-magnetization” in the context of the present invention refers to the property of the magnetic layer that if the magnetization of the magnetic layer changes due to the external magnetic field, this can be accompanied by domain wall motion, said domain wall motion predominantly occurring only in one or more part(s) of the layer’s magnetization loop. As discussed further below in more detail, the asymmetric re-magnetization properties of the magnetic layer can be exploited to achieve domain wall assistant transport of particle(s) and/or fluids across several domains.

In some aspects, the invention exploits the fact that the magnetic stray field caused by a domain wall can trap the magnetic fluid or particle(s) or at least part of the magnetic fluid or particles. The domain wall may e.g. be a Bloch wall or a Néel wall. In some aspects, the invention further exploits the fact that the magnetic fluid or the particle(s) can be dragged with the magnetic stray field, which stray field moves if the respective domain wall moves.

Advantageously, it can be achieved that the forces exerted by the stray field on the magnetic particle(s) according to the invention are several orders of magnitude greater than those conventionally exerted by a magnetic field caused by a current passing through a strip line. Thus, magnetic particle(s) can be transported very efficiently. Moreover an unwanted heating of the sample, the heat being a by-product of the current passing through a strip line, can be avoided.

Further advantageously, with the invention magnetic particles, including (super-)paramagnetic particles, can be transported while avoiding particle aggregation and the formation of clusters of aggregated particles. In particular, it can be avoided that due to induced magnetic moments the particles form large particle chains along the flux lines of the magnetic field. Such long range magnetic particle-particle interaction could enhance the probability of permanent particle clustering by short range non-magnetic chemisorption. Also, with the invention immobilization of the particles due to unspecific attachment to a substrate can be avoided.

Advantageously, with the invention the magnetic fluid or the magnetic particle(s) can be transported at a well defined velocity. In particular, within a considerable range the velocity can be independent of the particle’s size, mass or flow resistance and the fluid’s viscosity. Thereby, in particular, diverging drift velocities of individual beads in commercially available beads can be avoided, which beads in general come with a rather broad size distribution. This is particularly advantageous when the particles have to travel long distances, as diverging velocities in such cases may entail the formation of undesirable particle clusters.

The invention can advantageously be applied for the positioning and transport of (bio-)particles, including (bio-)molecules, in particular in a biological environment, for example inside or outside a living cell. The invention may also be advantageously applied to achieve magnetophoresis, which involves magnetic separation of particles by size or other physical properties. The invention may advantageously be applied in medical or pharmaceutical research, in particular in a lab-on-a-chip application, e.g. for the transport towards or away from a sensor element. The sensor may for example be a surface sensitive sensor such as a surface plasmon resonance sensor or magneto resistance sensor, e.g. of the kind disclosed in Schotter J. et al., IEEE Trans. Mag. 2002, 28, 3365.

PREFERRED EMBODIMENTS OF THE INVENTION

Preferred features of the invention which may be applied alone or in combination are discussed below and in the dependent claims. Reference numerals in the claims have merely been introduced to facilitate reading of the claims and are by no means meant to limit the scope of the claims to certain embodiments.

A preferred magnetic layer has an easy-plane anisotropy; preferably, the domains are pinned. A preferred magnetic layer is an exchange-bias system which usually is a multi-layer-system, i.e. the magnetic layer comprises several sub-layers, e.g. a pair of adjacent ferromagnetic and anti-ferromagnetic sheets. Advantageously, systems with pinned domains such as exchange-bias systems can have asymmetric re-magnetization properties.

Magnetic layers with asymmetric re-magnetization properties are preferred in the present invention. In a particularly preferred magnetic layer with an asymmetric re-magnetization property, domain-wall motion essentially only occurs in one of the two branches of the domains magnetization loop, preferably in the forward branch, which corresponds to an increasing strength (i.e. increasing absolute value) of the external magnetic field. Preferably, other re-magnetization mechanisms such as magnetization rotation and/or domain nucleation predominantly occur in the other branch, preferably the backward branch of the magnetization loop. Preferably, in the other branch essentially only magnetization rotation and/or domain nucleation occur.

In a preferred method according to the invention, the step of applying the external magnetic field comprises a domain wall assisted transport step in which one or more transport domain walls move. In the context of the present invention, "transport domain walls" are the domain walls that are intended to transport the fluid or the particle(s). This preferably occurs through the motion of the stray field associated with the domain wall which in turn can move the fluid particle(s). The domain wall motion can be induced by re-magnetization of the magnetic layer due to the external magnetic field being changed or switched on or off. Preferably, during the domain wall assisted transport step the strength of the external magnetic field is increased, usually but not necessarily starting from zero and preferably ending at its maximum strength.

The transport domain walls, preferably all domain walls, preferably move in a direction parallel to the plane of the magnetic layer. Thereby, advantageously, the fluid or the particle(s) can be moved across a plane that extends in parallel to the magnetic layer. Preferably, the transport domain walls, more preferably all domain walls, each extend perpendicularly to the plane of the magnetic layer, more preferably across the entire magnetic layer.

Preferably, at the end of the domain wall assisted transport step, the transport domain walls, preferably all domain walls, in the magnetic layer vanish. Usually, this occurs as the magnetic layer reaches magnetic saturation. Preferably, at or after the point where the transport domain walls vanish, the external magnetic field reaches its maximum.

In a preferred method according to the invention, the step of applying the external magnetic field comprises a restoring step in which re-magnetization due to the external magnetic field occurs through processes that do not involve motion of one or more transport domain walls. Thereby, advantageously in the restoring step backward motion of the fluid or particle(s) to be transported can be avoided. Preferably, in the restoring step no domain walls are moved at all. Instead of domain wall motion, re-magnetization in the restoring step preferably occurs through magnetization rotation and/or domain nucleation.

During the restoring step, preferably the external magnetic field is changed; preferably the field's strength is decreased, more preferably starting from its maximum strength and preferably ending at zero. At the end of the restoring step, preferably domain walls reappear that had previously vanished completely or partly due to the external magnetic field.

A restoring step preferably occurs after a transport step. More preferably, the external magnetic field at the beginning of the restoring step is the same as at the end of the preceding domain wall assisted transport step. Preferably a restoring step is followed by a domain wall assisted transport step. More preferably, the external magnetic field at the end of the restoring step is the same as at the beginning of the subsequent domain wall assisted transport step. Preferably, several domain wall assisted transport steps and several restoring steps take place alternatingly. By means of running through consecutive transport and restoring steps, the entire magnetization loop of the material can be run through.

The direction of the external magnetic field applied in the domain wall assisted transport step preferably extends in the transport direction. The external magnetic field is a magnetic gradient field. This embodiment of the invention exploits the fact that the direction of domain wall motion can be defined by the gradient of the external magnetic field. In particular, it can be achieved that when the strength of the magnetic gradient field is increased (in time) in the transport step, the transport domain walls move in the direction of increasing field strength (in space) of the gradient field. Thus, advantageously, by means of the magnetic gradient field, the direction in which the fluid or particle(s) are moved in the transport step(s) can be defined.

A preferred external magnetic field is an alternating magnetic field, preferably alternating between opposite orientations. More preferably, during the first transport step, and preferably during the following restoring step, the external magnetic field has an orientation opposite to that during the subsequent transport step, and preferably during the subsequent restoring step. In other words, in subsequent transport steps the external magnetic field has alternating orientations and the same can be true for subsequent restoring steps. It is an attainable advantage of this mode of operation that the domain walls that reappear after the restoring step at the location where the transport domain walls of the previous transport step vanished can serve as transport domain walls of the subsequent transport step. Thus, in an alternating magnetic field, the fluid or particle(s) can be further transported in each subsequent transport step. The external magnetic field preferably alternates in a way that the magnetization loop of the magnetic layer is repeatedly run through. The alternating magnetic field may for example have the form of alternating and space-apart positive and negative pulses, the raising edge of each pulse inducing the domain wall assisted transport step, and the trailing edge inducing the restoring step.

Preferably, the gradient of the strength, i.e. the gradient of the absolute value, of the external magnetic field has the same orientation in both alternations. Thereby, advantageously, it can be achieved that in both alternations of the external magnetic field the fluid or particle(s) are moved in the same direction.

In some embodiments of the invention, the step of applying the external magnetic field comprises at least one gradient driven transport step in which the external magnetic field applied is a magnetic gradient field and the magnetic fluid or particle(s) or at least some of the magnetic fluid or magnetic particles are moved by a force exerted on them by the gradient. These embodiments of the invention exploit the effect that the gradient field can drag the magnetic fluid or the magnetic particle(s) in a direction determined by the signs of the gradient and the field.

In one such embodiment of the invention, in the gradient driven transport step the force exerted on the fluid or particle(s) by the external magnetic gradient field overcomes the force exerted on the fluid or particle(s) by the magnetic stray field(s). Thereby, it can be achieved that the fluid or magnetic particle(s) or at least the part of the fluid or the magnetic particles which would otherwise be trapped by the domain wall(s) can move to an adjacent domain wall or even across one or more domain walls to a domain wall further away. In particular, it is possible to separate those particles that interact strongly enough with the external magnetic gradient field to overcome the force exerted by the magnetic stray field(s) from those that do not.

In one embodiment of the invention, in the gradient driven transport step the domain wall(s) vanish. Thereby, advantageously, it can be achieved that as the domain walls vanish the magnetic fluid or particle(s), or the part of the fluid or the magnetic particles which were previously immobilized by the domain wall(s) are now released to move away. This embodiment of the invention exploits the fact that if a domain wall vanishes, its magnetic stray field vanishes too. Even after the domain walls have vanished, there may still be unspecific interactions between the particles and the substrate which prevent some or all of the particles from moving. Again, this allows separating particles that interact with the external magnetic gradient field strong enough to overcome these unspecific forces from those that do not.

A method according to the invention may comprise both a first gradient driven transport step, in which the force exerted on the fluid or particle(s) by the external magnetic gradient field overcomes the force exerted on the fluid or particle(s) by the magnetic stray field(s), and a second magnetic transport step, in which the domain wall(s) vanish. Then, the fluid or particle(s) for which the force exerted by the gradient field is great enough to overcome the stray field(s) can be transported in the first gradient driven transport step, while fluid or particle(s) for which the force exerted by the gradient field is insufficient to overcome the stray field(s) can only be transported in the second transport step. Thus, these two types of fluids or particle(s) can be separated. Preferably, a step in which the domain walls vanish is followed by a restoring step in which the domain walls reappear.

The domains of the magnetic layer preferably have a remanent magnetic moment: This remanent magnetic moment preferably extends in parallel (or antiparallel) to the orientation of the external magnetic field. Thereby, advantageously, the external magnetic field can effectively re-magnetize the magnetic layer, inducing the effects described above. Preferably, the domains' remanent magnetic moments have an orientation that is in the plane of the magnetic layer, for example perpendicularly to the stripe direction or parallel to the stripe direction. Alternatively, the remanent magnetic moments are out of plane, for example perpendicular to the plane of the magnetic layer.

Adjacent domains of the magnetic layer preferably have oppositely orientated remanent magnetic moments. Thereby, it can be achieved that the domains grow or shrink, respectively, in the transport step, thereby entailing domain wall motion.

The preferred domains are stripe domains, wherein preferably the stripes extend perpendicularly to the transport direction. Moreover, preferably, the stripes extend perpendicularly to direction of the external magnetic field. Advantageously, the particles can then move in lines in the transport direction, which—as discussed above—usually is also the direction of the external magnetic field. However, other domain shapes are also possible, for example checkerboard domain patterns.

The domains of the magnetic layer preferably are artificially created, e.g. by light ion bombardment through a shadow mask in an in-plane applied magnetic field as described in J. Fassbender, et al., "Magnetization Reversal of Exchange Bias Double Layers Magnetically Patterned by Ion Irradiation" 2002, Phys. Stat. Sol. (a) 189, 439; Mougin, A., et al., "Magnetic micropatterning of FeNi/FeMn exchange bias bilayers by ion irradiation" 2001, J. Appl. Phys. 89, 6606; Ehresmann, A., "He-ion bombardment induced exchange bias modifications: Fundamentals and applications" 2004, Recent Res. Devel. Applied Phys. 7, 401; Theis-Bröhl, K., et al., "Exchange-bias instability in a bilayer with an ion-beam imprinted stripe pattern of ferromagnetic/antiferromagnetic interfaces" 2006, Phys. Rev. B 73, 174408; or Ehresmann, A. et al., "On the origin of ion bombardment induced Exchange Bias modifications in polycrystalline layers" 2005, J. Phys. D. 38, 801.

The magnetic fluid or particle(s) preferably are paramagnetic or superparamagnetic. The method according to the invention may, however, also be used for the transport of particles that show other types of magnetism, for example the transport of ferromagnetic fluids or particles. It is even possible to indirectly transport non-magnetic particles: This is achieved by transporting a magnetic fluid or magnetic particles which then drag the non-magnetic particles with them, preferably due to the viscosity of the fluid, steric interactions between the magnetic and non-magnetic particles or other effects. In particular, a local density increase of the magnetic particles in the ferrofluid over the domain walls can be exploited for the transport of non-magnetic particles. The artificial stray field pattern of the substrate thus can translate into a regular density pattern within the ferrofluid. It is achievable that nonmagnetic particles in the ferrofluid are located at positions with lower ferrofluid density, i.e. in between the stray field maxima. By moving the domain walls, e.g. with the domain wall movement assisted remote control (DOWMARC) scheme as explained in more detail below, the local density maxima of the ferrofluid can be moved together with the domain walls across the substrate, thereby moving the non-magnetic particles across the substrate.

BRIEF DESCRIPTION OF THE DRAWINGS

The invention is illustrated in greater detail with the aid of schematic drawings.

DETAILED DESCRIPTION OF EMBODIMENTS OF THE INVENTION

1. Overview of the Particle Transport System

Figure 1B:
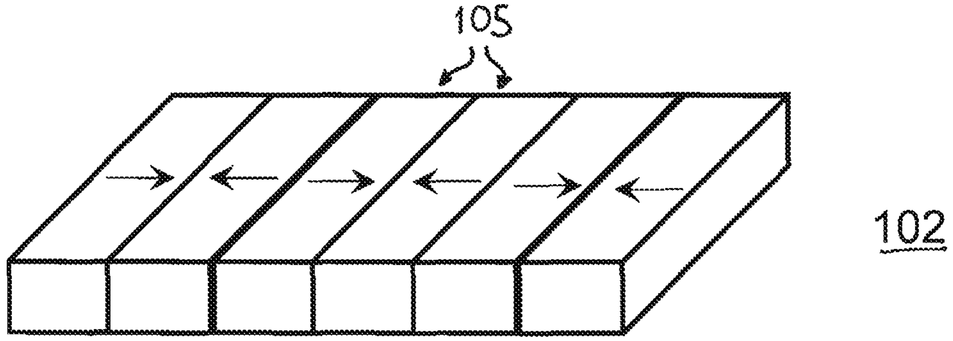
FIG. 1*b* in a perspective view schematically illustrates a magnetic layer according to the invention, the layer comprising stripe domains with magnetic moments in the plane of the layer and oriented perpendicularly to the stripe direction. Adjacent domains have oppositely orientated magnetic moments.
Figure 1A:
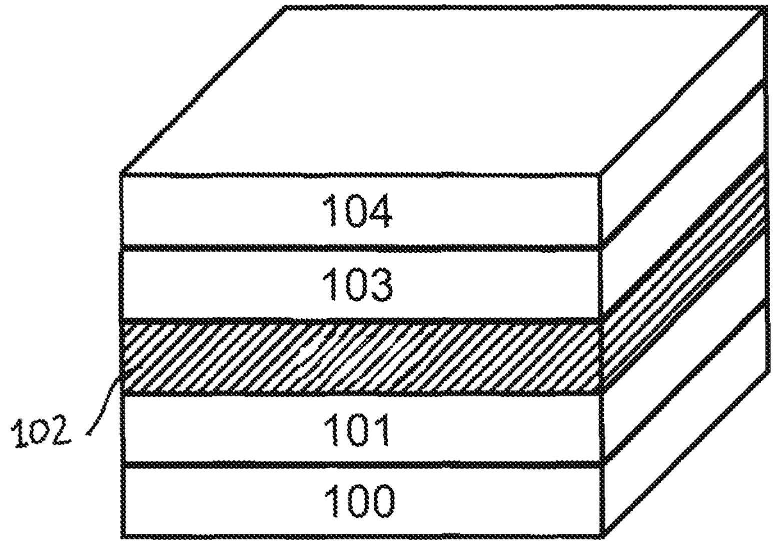
FIG. 1*a* in a perspective view schematically illustrates a device for the magnetic transport of particles, the device comprising a magnetic layer according to the invention.

In FIG. 1*a* schematically an exemplary transport device according to the invention is shown. The system consists of a carrier 100 covered by a thin buffer layer 101 inducing the proper growth conditions for the magnetic thin film system. On top of the buffer layer 101 a magnetic thin film or thin film system 102 is grown which acts as the magnetic layer according to the invention. The thin film or thin film system 102, the characteristics of which are described below, usually is capped by a very thin (typically a few nanometers) protective layer 103. On top of the protective layer either a non-magnetic solution 104 is disposed containing either paramagnetic, superparamagnetic or ferromagnetic particles, which will be transported, or a magnetic solution 104, e.g. a ferrofluid, in which with non-magnetic particles are immersed, where the non-magnetic particles will be transported.

Figure 1C:
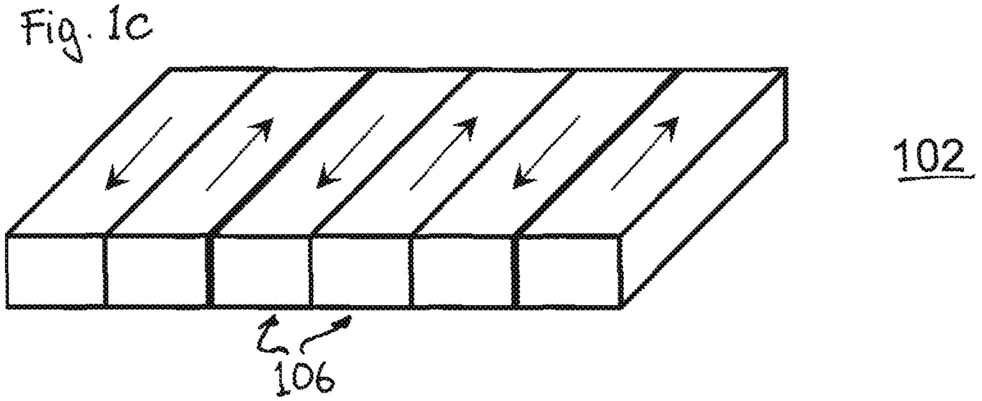
FIG. 1*c* in a perspective view schematically illustrates a magnetic layer according to the invention, the layer comprising stripe domains with magnetic moments in the plane of the layer and oriented in parallel to the stripe direction. Adjacent domains have oppositely orientated magnetic moments.
Figure 2A:
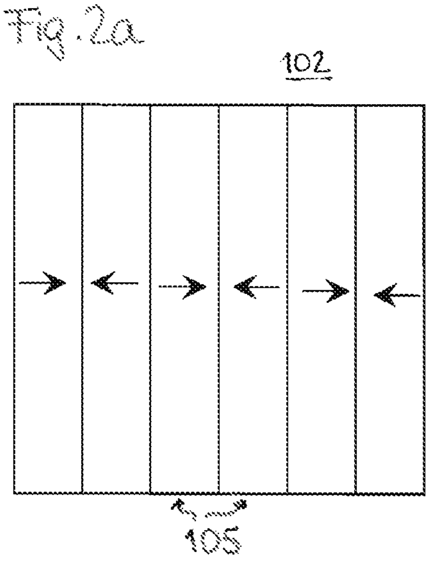
FIGS. 2*a* to 2*d* in a top view schematically illustrate configurations of artificially fabricated in-plane domains to be used for the one-dimensional and two-dimensional particle transport.
Figure 2B:
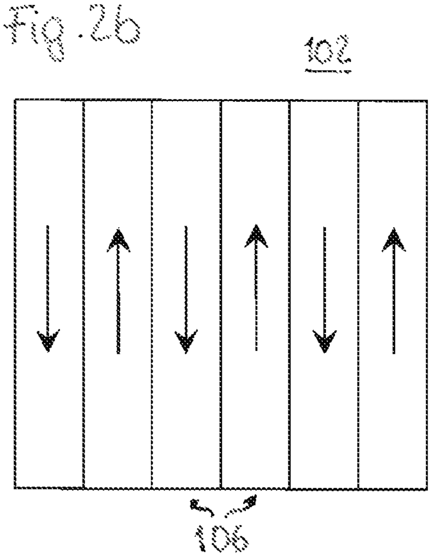
Figure 2C:
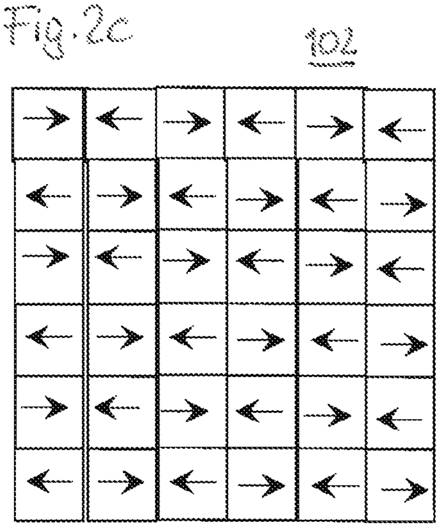
Figure 2D:
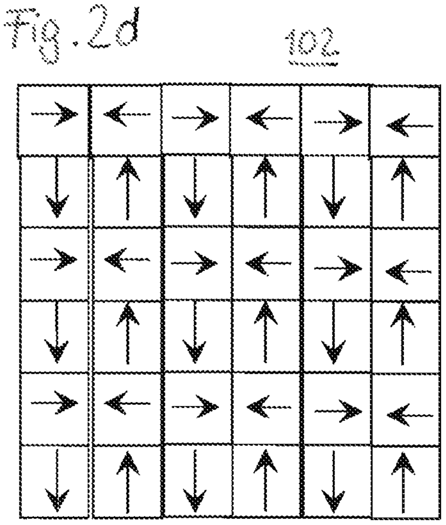

The magnetic thin film or thin film system 102 of the invention has the following features:

1) The planar film is patterned in artificial domains as exemplarily shown in FIGS. 1*b* and 1*c* for two domain configurations (also shown in top view in FIGS. 2*a* and 2*b*), where parallel in-plane stripe domains are sketched with either head-to-head/tail to tail 105 or side-by side 106 magnetization configurations in adjacent topographically not varying domains. Checkerboard patterns as exemplarily shown in FIGS. 2*c* and 2*d* in top view are also possible to be used for a 2-dimensional transport;

2) A magnetic layer or layer system with easy-plane anisotropy and showing an asymmetric re-magnetization in the forward and backward branch of the magnetic hysteresis loop: the re-magnetization mechanism in one branch of the hysteresis loop predominantly occurs by domain nucleation or magnetization rotation (or a mixture of both), and in the other branch at least two domains exist or are formed by nucleation and domain wall motion is the dominant re-magnetization mechanism. In this part of the hysteresis loop either a natural nucleation of domains prior to domain wall motion may occur or a layer system with artificially fabricated remanent domains is used.

Figure 3:
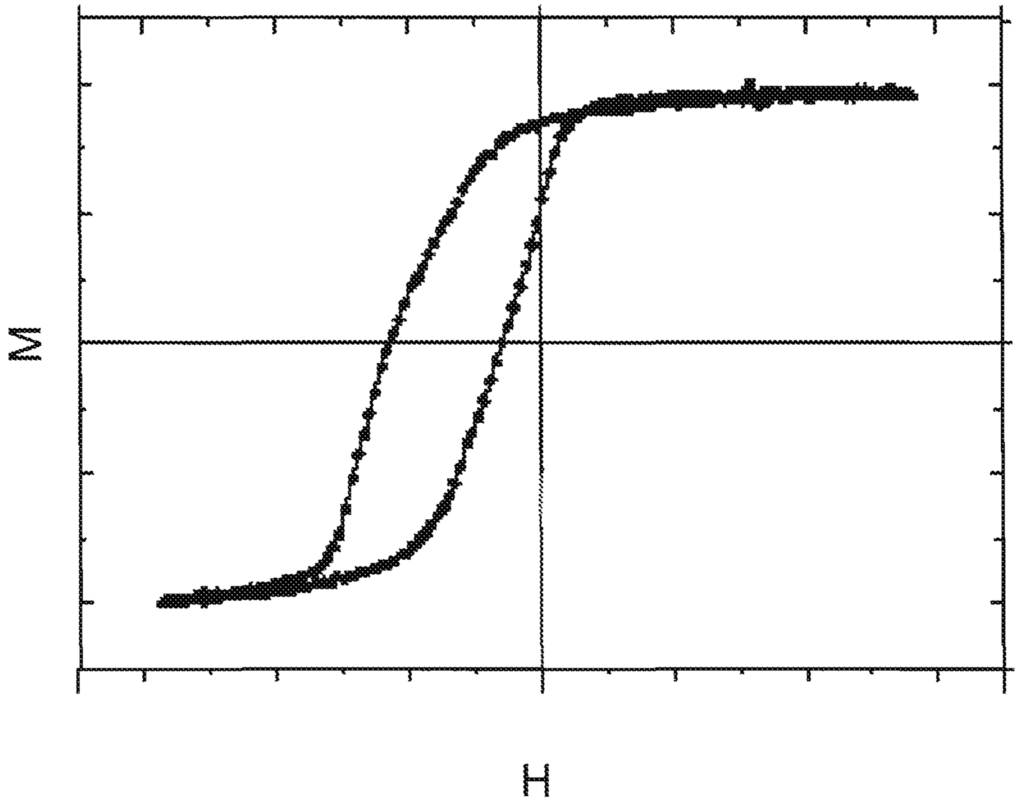
FIG. 3 shows an exemplary hysteresis loop for an exchange bias system, illustrating the asymmetric re-magnetization characteristics necessary for the domain wall motion assisted transport of particles. The exchange-bias shift of the loop is not relevant for the invention if layer systems are used without a domain pattern in remanence.

2. Example for a Substrate and Layer System for Magnetic Field Induced Domain Wall Motion Assisted Particle Transport The carrier 100 of the particle transport device may typically be but is not limited to glass slides or silicon wafers (flexible substrates are also possible) with or without the buffer layer 101. The device further comprises a magnetic layer system or a single magnetic layer 102, preferably having an in-plane remanent magnetization. A schematic hysteresis loop of a magnetic layer having the asymmetric re-magnetization property that is required in the present example is sketched in FIG. 3. The exemplary magnetic layer is an exchange-bias system without artificially fabricated domains. It consists of a ferromagnetic and an antiferromagnetic thin film in contact to each other. It is known that such magnetic layers, which display unidirectional in-plane anisotropy, possess an asymmetric re-magnetization by domain wall motion preceded by domain formation in one hysteresis loop branch and coherent rotation and domain nucleation in the reverse branch; see e.g. McCord et al., "Observations of asymmetric magnetization reversal processes in CoFe/IrMn bilayer systems" 2003, J. Appl. Phys. 93, 5491.

The magnetic layer may for example be Si/Ta (5.3 nm)/Ru (2.03 nm)/Ir17Mn83 (11.6 nm)/Ni80Fe20 (7.75 nm)/Ta (3.6 nm), grown by dc magnetron sputtering in UHV in a magnetic field of 1.27 kA/m. The exchange bias in this example has been initiated by field growth, but may as well be achieved by field cooling where the sample after film deposition is cooled from a temperature between the Curie temperature of the ferromagnet and the Néel temperature of the antiferromagnet down to below the Néel temperature of the antiferromagnet or by light-ion bombardment with, e.g., keV-He ions, in an external magnetic field or by any other suitable method. Also any other exchange bias layer system may be used showing the asymmetric re-magnetization in the sense described above.

The exchange bias layer described above is already suitable for particle transport assisted by domain wall motion, however, the domains forming during the re-magnetization process are random in size and geometries due to the natural ripple domain pattern in such systems; see for example J. Fassbender, et al., "Magnetization Reversal of Exchange Bias Double Layers Magnetically Patterned by Ion Irradiation" 2002, Phys. Stat. Sol. (a) 189, 439. Nevertheless such a magnetic layer can already be used for domain wall motion assisted particle transport as described below with emphasis on layers with artificially fabricated domain geometries, however with the magnetic layer without artificial magnetic patterns the transport steps are not equidistant and particles do not move in rows.

3. Artificial Domains Fabricated by Ion Bombardment

In exchange biased layers it is well known that fabrication of artificial in-plane magnetized domains is possible by light ion bombardment through a shadow mask in an in-plane applied magnetic field; see. J. Fassbender, et al. "Magnetization Reversal of Exchange Bias Double Layers Magnetically Patterned by Ion Irradiation" 2002, Phys. Stat. Sol. (a) 189, 439; Mougin, A., et al., "Magnetic micropatterning of FeNi/FeMn exchange bias bilayers by ion irradiation" 2001, J. Appl. Phys. 89, 6606; and Ehresmann, A., "He-ion bombardment induced exchange bias modifications: Fundamentals and applications" 2004, Recent Res. Devel. Applied Phys. 7, 401. Typically 10 keV-He ions have been used, but other ions and acceleration voltages may be also used.

Bombardment through a shadow/lithography mask with, e.g., 5 μm wide stripes covered by 800 nm thick resist and 5 μm wide resist free stripes with their long axes arranged perpendicularly to the exchange bias direction, in an external in-plane magnetic field of 80 kA/m antiparallel to the original exchange bias initialization field creates after the removal of the mask antiparallely magnetized stripe domains with effective head-to-head and tail-to-tail domain walls (ion bombardment induced magnetic patterning, IBMP as described in Mougin, A., et al., "Magnetic micropatterning of FeNi/FeMn exchange bias bilayers by ion irradiation" 2001, J. Appl. Phys. 89, 6606; and Ehresmann, A., "He-ion bombardment induced exchange bias modifications: Fundamentals and applications" 2004, Recent Res. Devel. Applied Phys. 7, 401; Theis-Bröhl, K., et al., "Exchange-bias instability in a bilayer with an ion-beam imprinted stripe pattern of ferromagnetic/antiferromagnetic interfaces" 2006, Phys. Rev. B 73, 174408; and Ehresmann, A. et al., "On the origin of ion bombardment induced Exchange Bias modifications in polycrystalline layers" 2005, J. Phys. D. 38, 801. The root mean square (rms) surface roughness of the films as quantified by atomic force microscopy after removing the resist mask may be less than 1 nm. Adjacent artificial stripe domains may be prepared to possess effective antiparallel magnetizations perpendicular to their long axis (201) and stable in remanence.

Figure 4:
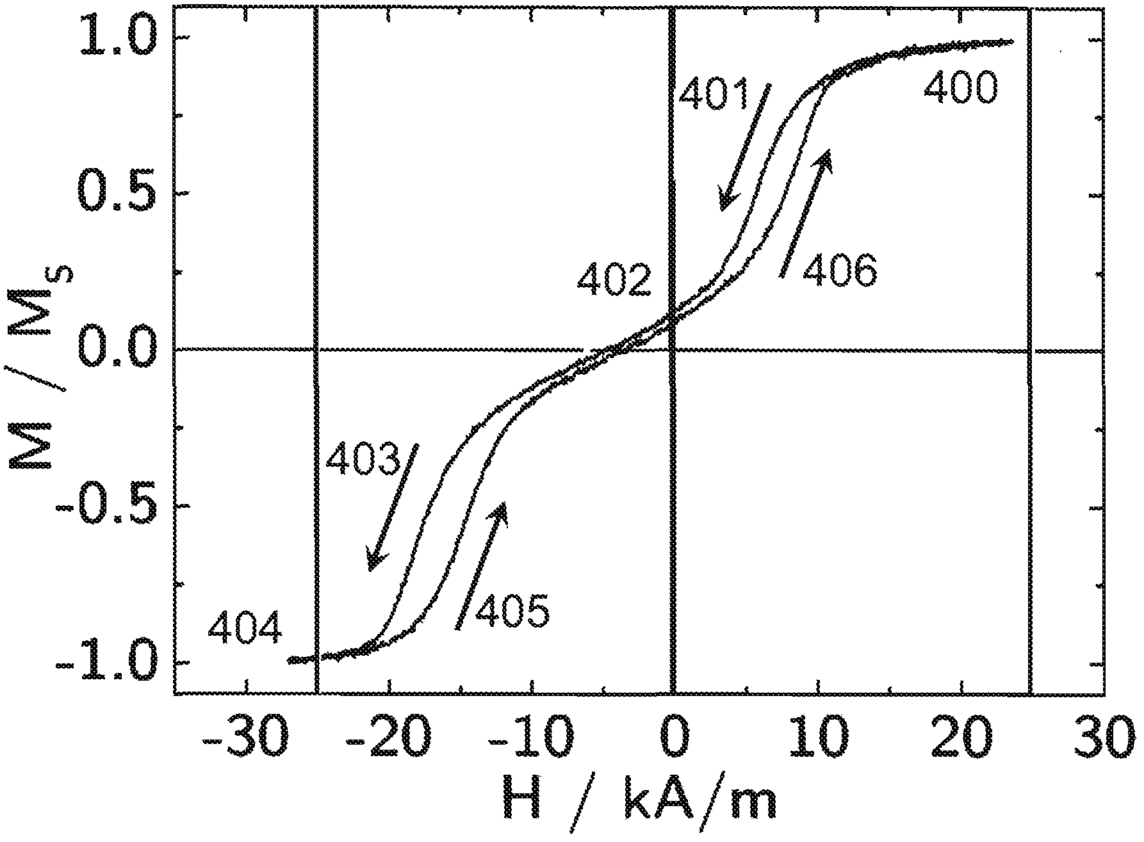
FIG. 4 schematically illustrates a double hysteresis loop of an exchange bias layer system patterned in stripe domains with antiparallel anisotropy directions in adjacent stripes. The two oppositely shifted hysteresis loops represent the re-magnetization in the adjacent artificial stripe domains. The reference numerals indicate different re-magnetization ranges and correspond to the reference numerals in FIG. 5.

A typical hysteresis loop as obtained by, e.g. L-MOKE measurements or any other suitable method is displayed in FIG. 4. It can be seen that there are two antiparallely shifted sub-loops corresponding to the two oppositely exchange biased stripes. With this technique not only head-to-head/tail-to-tail stripe domains or side by side magnetized adjacent domains (FIGS. 2*a* and 2*b*) but also checkerboard domain patterns (FIGS. 2*c* and 2*d*) can be fabricated with regularly spaced squares for a two dimensional transport. Many other artificial domain configurations and domain geometries are also possible.

4. Pulsed Transport

The transport may be performed in a fluid cell confined by the magnetically patterned sample, a layer of parafilm (American National Can Company, thickness 127 μm) with a circular punched hole of 11 mm diameter and a coverslip (Hecht-Assistant, thickness 210 μm). This particular fluid cell had therefore a volume of 12 μl. The magnetic gradient field was produced by an electromagnet. As power supply served a KepCo bipolar BOP 36-12M. The superparamagnetic spherical particles were purchased at Micromod GmbH (Micromer-M—COOH) consisting of superparamagnetic magnetite grains in a polymer matrix with a diameter of 1 μm or 2 μm and coated with a carboxyl-acid (COOH—) group. Sizes of particles have been chosen to be observable in an optical microscope, but may as well be smaller. Particle transport has been observed by means of a Zeiss Axiotech Vario microscope with a magnification of 500 in combination with a video camera QVC, TK-C1480E, TV-camera, 25 frames/s, interlaced). The bottom of the substrate may be pointing towards the floor or the surface of the substrate may be hanging overhead. In the second case only particles with superparamagnetic characteristics will be on the substrate, attracted by the strong local stray fields, where forces are stronger than gravitational forces. Nonmagnetic particles will be subject to gravity and will not hinder the movement of the particles. This set up as well as the chosen particles and layer systems are only described in an exemplary fashion.

Figure 5:
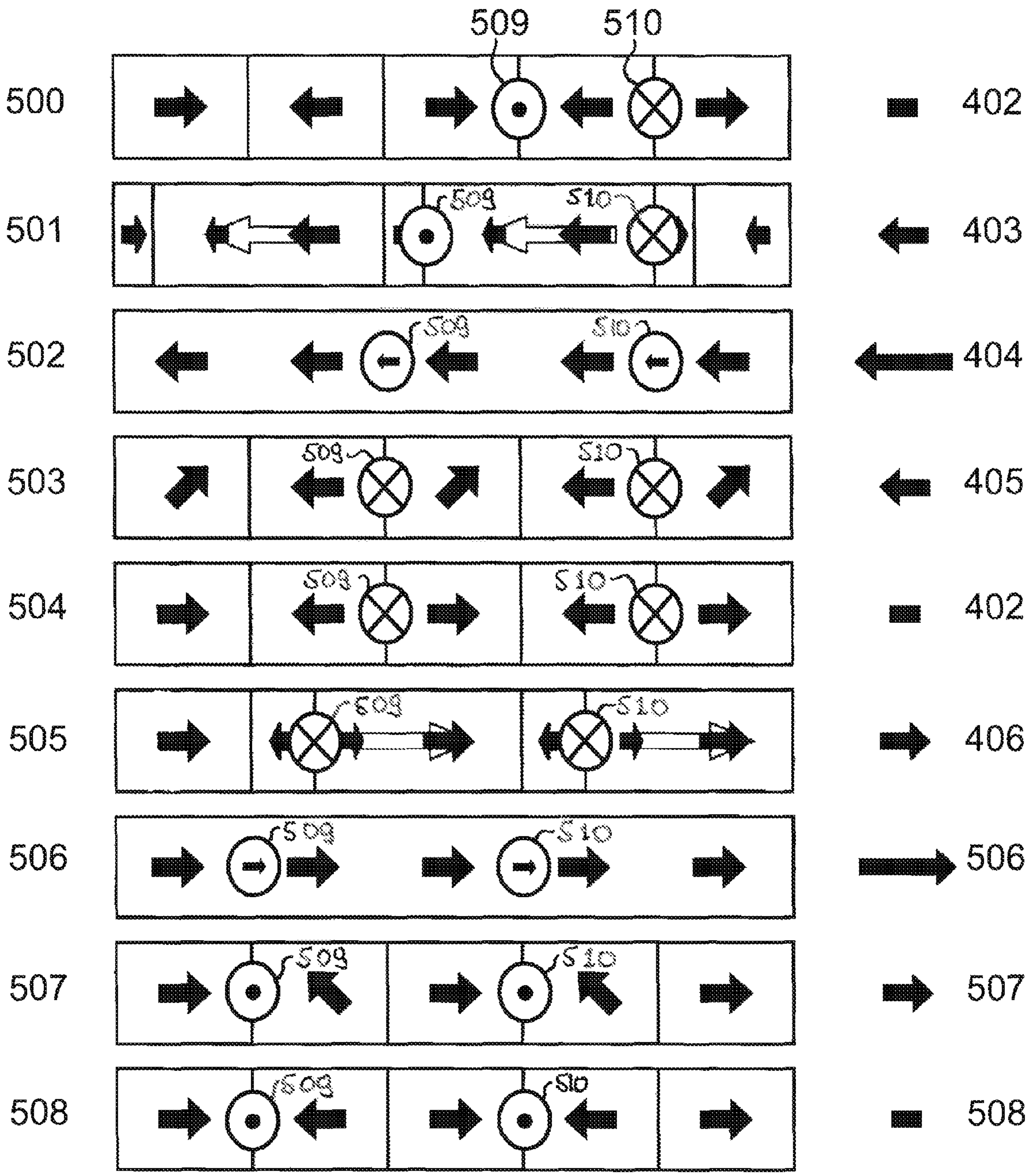
FIG. 5 is a simplified sketch in a side view of the domain wall motion assisted transport of particles. From top to bottom the development of the substrate magnetization in the main reversal processes is shown. Arrows at the right indicate exemplarily magnitude and direction of the external magnetic field. Reference numerals at the right refer to the re-magnetization mechanism displayed in the hysteresis loop of FIG. 4.

5. Transport Concept No 1: Domain Wall Motion Assisted Remote Control (DOWMARC) of Particles The first transport concept of magnetic field induced domain wall motion assisted remote control (DOWMARC) for particle transport will be exemplarily explained using the example of a layer system with artificial stripe-domains and superparamagnetic transported particles. The transport scheme is illustrated in FIG. 5. The concept will be explained together with FIG. 4, showing the hysteresis loop of the patterned substrate. The reference numerals in FIG. 4 indicate different re-magnetization ranges and correspond to the reference numerals in FIG. 5.

After having wetted the magnetically patterned substrate by the particle solution, the superparamagnetic particles will be attracted by the remanently stable local stray fields of the domain walls or domains when no external field is applied (step 500, external magnetic field 402). Using, e.g., the magnetic layer with the artificial stripe domain pattern described above, each 5 μm there are strong local and inhomogeneous stray fields attracting particles. The top view of this situation is sketched in FIG. 5, step 500, where the artificial in-plane domains are shown with head-to-head or tail-to-tail domain walls in remanence. This corresponds to position 402 of the magnetic field of the hysteresis loop of FIG. 4. Two particles 509, 510 are exemplarily shown with their respective magnetizations, one 509 pointing outwardly from the substrate and one 510 pointing into the substrate. In step 500 a situation is displayed where the distance between the particles corresponds to one stripe width, i.e. 5 μm. In reality, when using artificial stripe domains, the particles will form rows with distances of e.g., 5 μm.

If the magnetic field is decreased towards negative values (branch 403 of FIG. 4) there is domain wall motion within each second stripe, since these stripes will be re-magnetized. Domain walls are not vanishing during their motion and so are the stray fields and therefore the local stray fields further attract the particles 509, 510 towards the substrate surface, even during particle motion (see FIG. 5, step 501). Particles sitting on the moving domain wall will therefore move together with the wall, particles sitting on the other wall will stay where they are. The first half loop will therefore increase the distance between two rows of particles to two domain widths.

After magnetic sample saturation (404 in FIG. 4) the particles 509, 510 will stay at the positions where the domain walls finally vanish (step 502 in FIG. 5). The distance between two particles 509, 510 has then increased to double of the stripe width and will stay like this during the whole transport process. By increasing the magnetic field again towards 0 (branch 405 in the loop of FIG. 4) re-magnetization of one part of the stripes occurs via magnetization rotation or domain nucleation as depicted in FIG. 5, step 503. The particles 509, 510 will therefore not be transported. When increasing the external field still further (branch 406 of the loop in FIG. 4) in each second of the stripes re-magnetization may occur via domain wall motion, dragging the particles 509, 510 along with the domain wall. This time all particles 509, 510 are moved, and the distance between two rows of particles 509, 510 will stay two stripe widths.

All particles within one row, i.e. on one domain wall possess the same direction of induced magnetic moment and therefore repel each other. Therefore particle agglomeration is largely avoided with this transportation scheme. Upon sample saturation in the positive direction (400 in FIG. 4) and in the back branch of the loop (401 in FIG. 4) particles are not moved (see steps 506 and 507 in FIG. 5). To move the particles forward and backward the direction of the increase of the magnitude of the magnetic field has to be changed, changing the direction of the domain wall movement and therefore the direction of the particle transport.

Maximum achievable particle transport velocities measured for such a system are at least 2 orders of magnitude higher as for a corresponding magnetic field gradient driven transport under steady state conditions. The transport concept is also particularly useful for the transport of very small particles, since the centres of these particles are very close to the substrate and therefore experience even stronger local stray fields and gradients as compared to larger particles.

Figure 6:
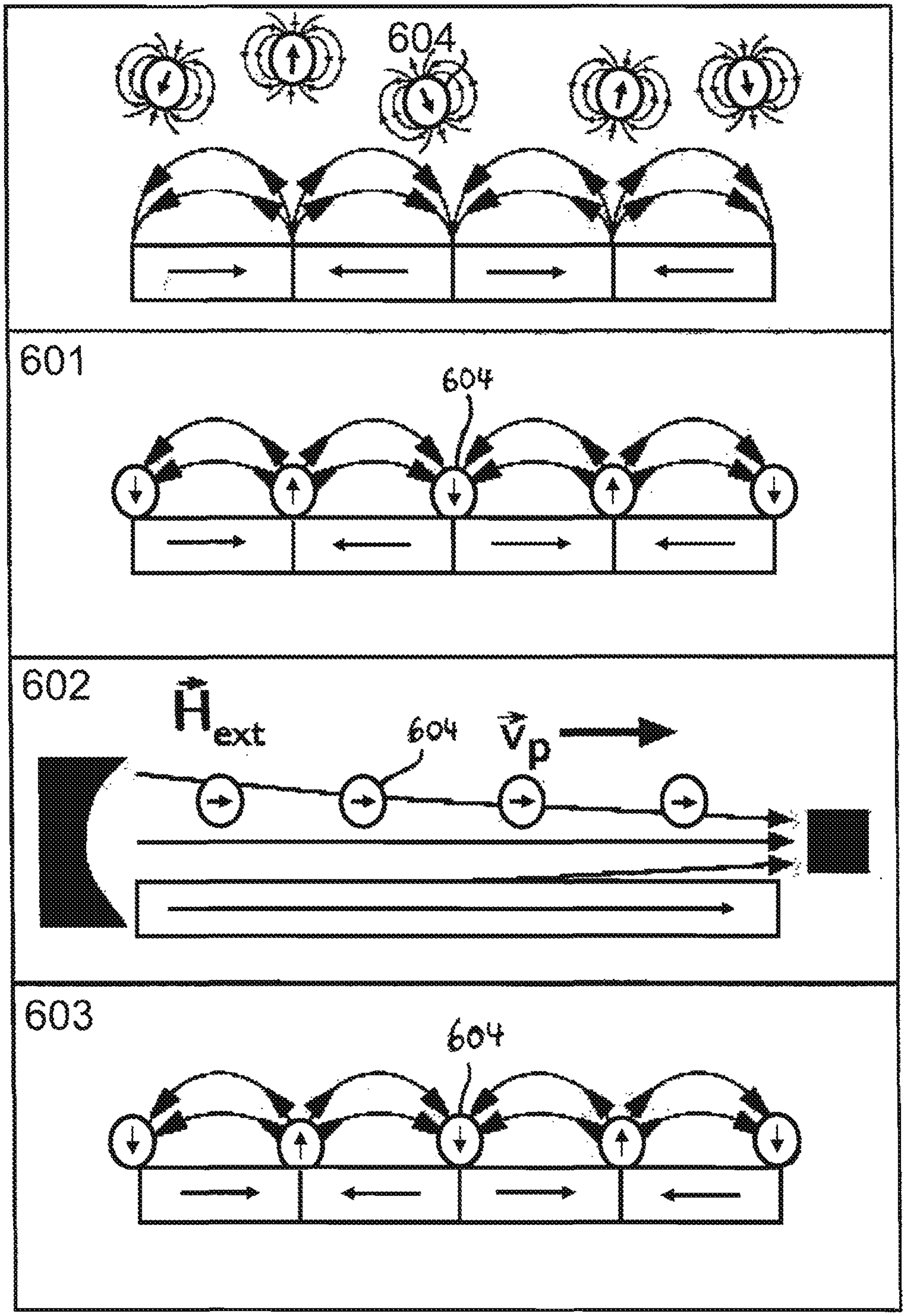
FIG. 6 illustrates the gradient driven transport by means of a side view on an artificial magnetic stripe pattern. Associated stray fields and the behaviour of the particles are shown. Any other in-plane domain configuration may be used as well. In the remanent state, the particles' magnetic moments align with the stray fields and accumulate at the domain walls. In an external inhomogeneous in-plane magnetic field with in-plane gradient the sample is saturated (no domains) and the magnetic force drags the particles towards higher flux density. After switching the external field off, the domains reappear and the beads are positioned above the next domain wall.

6. Transport Concept No 2: Direct Magnetic Gradient Driven (DMGD) Transport of Particles on a Substrate with Artificial Domains The basic idea of the DMGD transport scheme on a substrate with artificial domains is shown in the simplified sketch of FIG. 6. The exemplarily shown superparamagnetic beads 604 in solution on this substrate are attracted by the strongly inhomogeneous stray fields above the domain walls towards the substrate surface, similar to the first step shown in FIG. 5, step 500 for the DOWMARC scheme. This results in an aggregation of the particles along the domain walls when no external magnetic field is applied (step 601), as has already been shown experimentally; see Ennen, I., et al., "Manipulation of magnetic nanoparticles by the strayfield of magnetically patterned ferromagnetic layers" 2007, J. Appl. Phys. 102, 013910.

When an external in-plane magnetic gradient field perpendicular to the long stripe axis is applied to saturate the substrate, therefore switching off the strong local magnetic stray fields over the domain walls binding the particles 604 to the surface, the gradient drags the superparamagnetic particles 604 across the sample surface (step 602). The particles 604 move perpendicularly to the long stripe axes towards the formerly existing next domain wall. If the magnetic in-plane gradient field is switched off after a time to move the particles 604 from one artificial domain wall to the next, the domains will reappear, as shown in Mink, V. et al., "Switchable resonant x-ray Bragg scattering on a magnetic grating patterned by ion bombardment." 2006, J. Appl. Phys. 100, 063903, and so will the strong local stray field gradients over the domain walls and the particles 604 are again attracted to the substrate surface.

The particles 604 have then moved from one domain wall to the next (step 603), i.e. a distance defined by the width of the artificial parallel-stripe domains. The operational difference between the DMGD and DOWMARC transport schemes is that in the first case the external magnetic field and gradient is switched between a suitable relatively high value in saturation of the substrate (strong enough to drag the particles) and remanence and in the second case between relatively low absolute field values close to or in positive and negative saturation of the layer system. Both transport concepts can be used alternatingly.

7. Transport of Non-Magnetic Particles

By the DOWMARC scheme also non-magnetic particles can be transported if a ferrofluid is used. The stray fields of the magnetically patterned substrate over its domain walls cause a local density increase of the magnetic particles in the ferrofluid over the domain walls, translating therefore the artificial stray field pattern of the substrate to a regular density pattern within the ferrofluid. Nonmagnetic particles in the ferrofluid will therefore be located at positions with lower ferrofluid density, i.e. in between the stray field maxima. By moving the domain walls with the DOWMARC scheme the local density maxima of the ferrofluid will be moved together with the domain walls across the substrate, thereby moving the non-magnetic particles across the substrate.

8. Magnetophoresis Type 1

With the two described transportation schemes the following application for magnetophoresis is feasible for separating two types of particles with different contents of magnetic material:

combine the DOWMARC transport with the DMGD transport in such a way that the field strength and gradient in the DMGD scheme are chosen such that the particles with more magnetic material (usually the larger particles) are transported to one side of the sample and the particles with less magnetic material will stay trapped by the strong local stray fields during the DMGD mode of transport. Both transportation schemes possess different dependencies for particle transport on the particles' magnetic contents and their geometrical characteristics: for the DMGD scheme the force acting on the particles is proportional to a quantity characterizing the amount of magnetic material in the particle (for superparamagnetic particles this is the volume of the particle times the volume average of the particle's magnetic susceptibility). The force on the "larger" particle induced by the magnetic field and gradient, has to be chosen such that the unspecific forces between particle and substrate are overcome such that the particle will be driven by the external magnetic field. Since the particles with less magnetic contents will experience a weaker force they will stick to the substrate since particle substrate interactions are not strongly dependent on the particle diameter, but mainly on the particle-substrate materials as well as on the pH-value of the solution the particles are in.

Then switch to the DOWMARC transportation scheme with a considerably weaker external field and gradient, such that the "larger" particles will not be transported by the direct magnetic force and use a switching frequency between positive and negative saturation enabling the smaller particles (i.e. those with less magnetic material) to follow the domain walls and where the larger particles cannot follow the quick domain wall motion. This is possible since the time for the particles to reach the steady state velocity scales with the diameter squared. If this time is too long the particles cannot follow the quick domain wall motion. The direction of transport can be chosen antiparallel to the DMGD transport. In such a way a very simple magnetophoresis technique is possible separating the two types of particles to two different sides of the substrate.

9. Magnetophoresis Type 2

Magnetophoresis is also possible by the DOWMARC scheme only. Here only the switching frequency between negative and positive magnetic saturation of the substrate has to be adapted for transportation of the “larger” and “smaller” particles. Smaller particles may follow fast switching frequencies, larger particles do not. This scheme can also be applied for “magnetophoresis” of non-magnetic particles in a ferrofluid. In this magnetophoresis application small particles will be transported to one side of the substrate, larger particles will remain on the substrate.

10. Magnetophoresis Type 3

A third possibility for magnetophoresis is to apply an external in-plane magnetic field and gradient without saturation of the artificial domain pattern on a mixture of particles to drag the larger particles away from their trap over the domain walls. The force exerted by the external field on the larger particles is stronger than the trap force induced by the local stray fields (see above) and smaller particles stay trapped since for them the force exerted by the external magnetic field is weaker as compared to the larger particles and at the same time the force due to the local stray field gradients is stronger since their centre is closer to the surface. Here the smaller particles remain on the substrate and the larger particles will be transported to one side of the substrate.

11. Combination with Surface/Particle Functionalization

Figure 7:
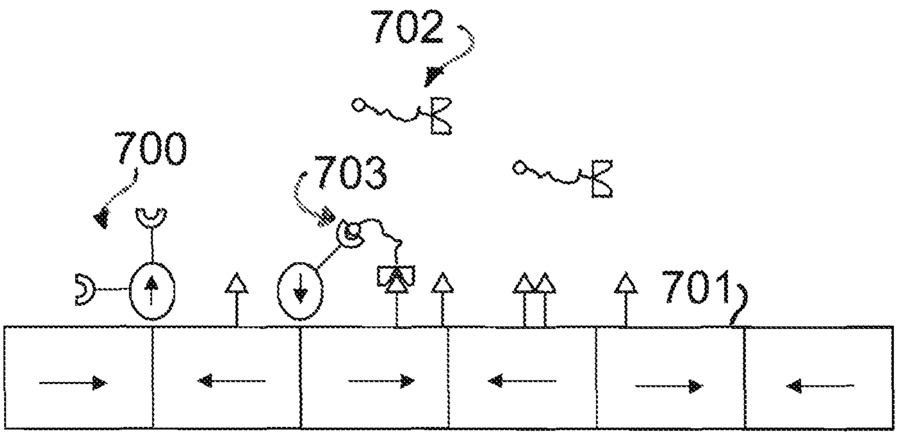
FIG. 7 in a schematic side view illustrates functionalized particles binding to functionalized surfaces via biomolecules (not to scale)

The DOWMARC and DMGD transportation schemes can be used to transport and detect biomolecules by functionalized particles. One application scheme is sketched in FIG. 7, where receptor functionalized particles 700 are dragged by one of the two transportation schemes described here through a solution across a surface which by itself is functionalized as well 701. Possibly existing biomolecules 702 fitting to the receptors will either bind to the surface or to the particle 700.

Since the particles during the described transport schemes are forced to stay close to the surface, there is a high probability that a particle will bind to the surface via the biomolecule 703. These particles are then immobilized and can be detected particularly well by optical or surface sensitive methods, e.g. surface Plasmon resonance techniques or magnetoresistive techniques. The particles are then measures for the biomolecules in the solution.

Since the particles are forced to stay close to the surface with the transport methods according to the invention, this will lead to a very efficient binding to the functionalized substrate surface as compared to standard systems operating with the passive actuation of the particles by laminar flows, where binding efficiency is determined by the diffusion of the particles between adjacent flow sheets. Of course magnetophoresis types 1-3 may be also used to separate particles with and without cargo.

12. Cargo Transport Using the Particles as Carriers

The particles transported by the described transportation schemes may serve as carriers for, e.g. biomolecules, nucleic acids, or cells, where the cargo is attached to the particle via a specific functionalization of the particle surface or by incorporation in case of cells. In such a way the cargo may be transported to a specific site on the substrate, even for biomolecules to be transported inside living cells immobilized on the magnetically patterned substrate. Non-immobilized cells may be dragged by the particles as well. Since the transport of the particles in the DOWMARC scheme is stepwise and in rows this may lead to a very efficient detection of the biomolecules, since, e.g. an optical detection via fluorescent markers may focus only on a very defined position or line of the substrate enabling efficient detection due to the high concentration of particles. Moreover the advantage of the present transportation schemes is that the particles are forced to stay close to the surface of a substrate and may therefore enhance the detection efficiency by, e.g. surface Plasmon resonance or magnetoresistive techniques or any other surface sensitive method.

13. Creation of Micro Flows and Efficient Mixing of Small Volumes

Since the particles in the DOWMARC mode of transport are aligned in rows and move together in rows close to the surface of a magnetically line-patterned substrate, this is a very efficient way to create micro flows in, e.g., ducts with narrow openings. Since the distance between two rows of particles is defined by twice the domain width it is feasible to drive defined quantities of liquid through narrow openings by each field pulse, resembling a conveyor belt.

For surface Plasmon resonance type sensors the DOWMARC mode of transport may be used to create largely turbulent flows, therefore enabling biomolecules to approach efficiently a functionalized surface. The detection time in this sensor type is often controlled by the diffusion time of the biomolecule between adjacent sheets of a laminar flow, transporting the biomolecule solution to the sensitive surface. The turbulent flow created by the moving particles will reduce the time for surface approach considerably. By moving the particles backward and forward also an efficient mixing of a small volume of solution is possible, therefore increasing reaction rates in very small volumes considerably.

14. Micro- and Nanoparticle Sieve and Fractionated Particle Sieving

Figure 8:
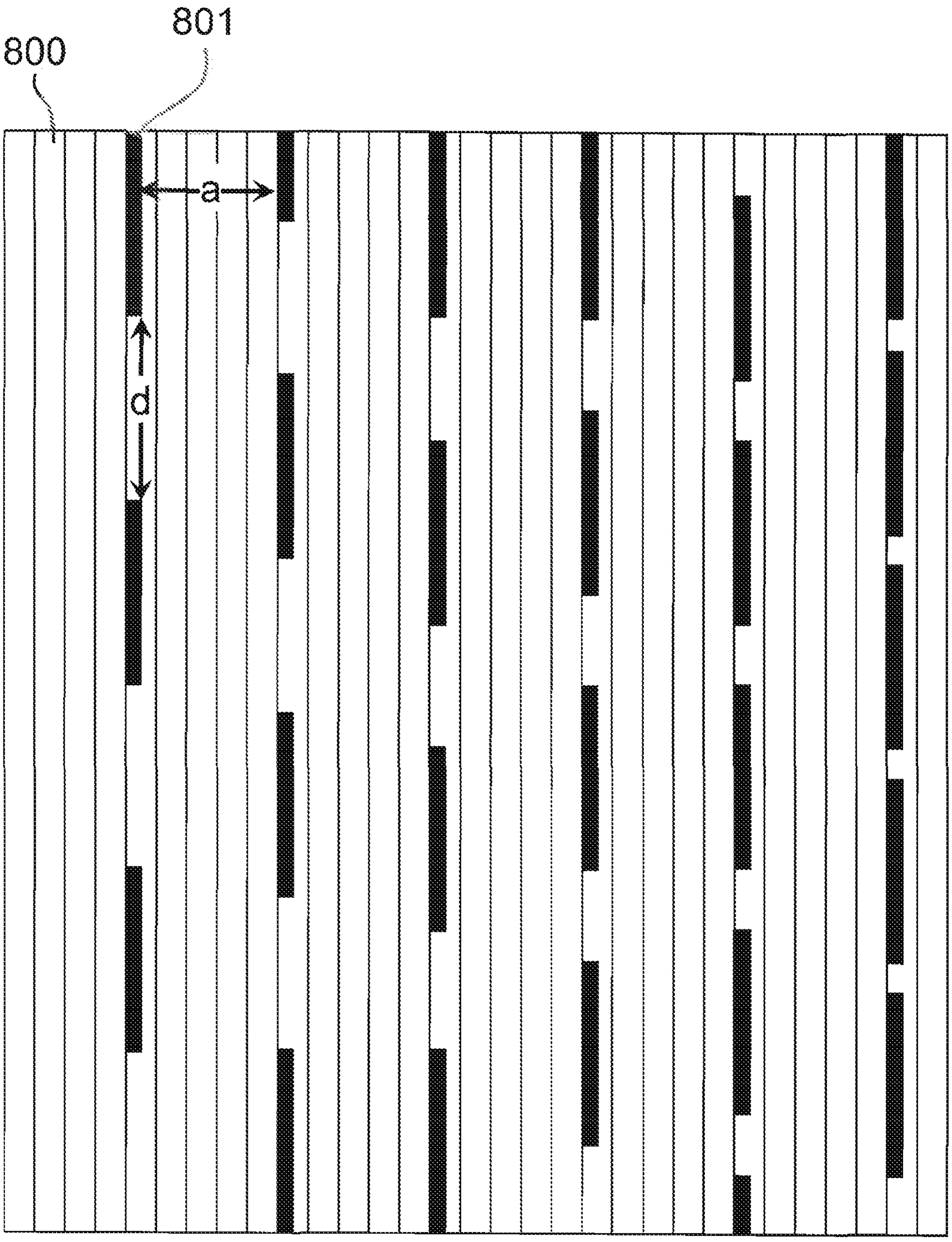
FIG. 8 in a schematic top view illustrates a device for fractionated particle sorting (top view and not to scale).

Another possible application for the DOWMARC scheme of particle transport is a particle sieve. The schematic drawing of such a device is shown in FIG. 8, where the main particle transport direction is from left to right. It consists of a substrate with artificial magnetic stripe domains 80) and lithographically fabricated barriers 801 on top of the substrate with gaps of width d. The barriers may be deposited with distances of at least equal or larger than 3 stripe-domain widths. Either one line of barriers with one gap d or many lines of barriers with decreasing gaps d may be deposited. In the first case two fractions of particles may be separated, those with diameters larger than d will stay on the left side of the barrier and those with a diameter smaller than d will pass through the gaps.

Due to the DOWMARC transport scheme particles will stay close to the surface; therefore no particles will swim over the barrier and the barrier height may be limited to the particle radius or higher.

Particles may be moved at least two steps forward and one step backward. The first forward step would drive particles with a diameter smaller than d through the barrier gaps, larger particles will not pass through. In the second forward step particles of the second row will add to the particles which are held back by the barrier. The step backward cleans the barrier gaps from large particles stuck there and will mix the particles of the two rows. Then again two steps forward and one backward.

In this way, by using successive barriers with decreasing gaps a fractionated sorting of particles is possible. Size selected particles may in the end be extracted by a magnetic field directed parallel to the stripes. This particle sorter may be used for magnetic particles, being moved by the moving domain walls of the substrate or for non-magnetic particles when a ferrofluid is used and the particles are driven by the moving density maxima of the ferrofluid over the domain walls.

The features described in the above description, the claims and the figures can be relevant to the invention in any combination.

The invention claimed is:

1. A method of transporting a magnetic fluid (104) or at least one magnetic particle (509, 510, 604, 700), the method comprising the steps of:

providing a magnetic layer (102), wherein the magnetic layer (102) has an asymmetric re-magnetization property, wherein a magnetic layer (102) exhibits the asymmetric re-magnetization property if, when a magnetization loop of the magnetic layer (102) is run through by changing an external magnetic field applied to the magnetic layer (102), a change of the magnetization of the magnetic layer (102) due to the changing of the applied external magnetic field predominantly occurs through domain wall motion of one or more domain walls of magnetic domains in the magnetic layer (102) only in a part of said magnetization loop of the magnetic layer (102);

placing the magnetic fluid (104) or the at least one magnetic particle (509, 510, 604, 700) in a vicinity of the magnetic layer (102) so that it can magnetically interact with the magnetic layer (102); and applying an external magnetic field, wherein the step of applying the external magnetic field comprises a domain wall assisted transport step in which one or more domain walls of magnetic domains in the magnetic layer (102) move under the influence of the applied magnetic external field, so as to transport the magnetic fluid or the at least one magnetic particle using a magnetic interaction between the magnetic fluid or the at least one magnetic particle and said one or more domain walls in the magnetic layer (102).

2. The method according to claim 1, wherein the magnetic layer (102) comprises pinned magnetic domains.

3. The method according to claim 1, wherein the magnetic layer (102) is an exchange bias system.

4. The method according to claim 1, wherein the part of the magnetization loop in which said change of the magnetization of the magnetic layer (102) occurs predominantly through the domain wall motion is one of two branches of the magnetization loop of the magnetic layer (102), wherein the two branches of the magnetization loop of the magnetic layer (102) are a forward branch wherein the magnetization loop of the magnetic layer (102) is run through by increasing a field strength of the external magnetic field applied to the magnetic layer (102), and a backward branch wherein the magnetization loop of the magnetic layer (102) is run through by decreasing the field strength of the external magnetic field applied to the magnetic layer (102).

5. The method according to claim 1, wherein the magnetization loop of the magnetic layer (102) comprises another part in which a change of the magnetization of the magnetic layer (102) due to the changing of the applied external magnetic field predominantly occurring through at least one of a nucleation of magnetic domains in the magnetic layer (102) and a rotation of magnetizations of magnetic domains in the magnetic layer (102), and wherein the step of applying the external magnetic field comprises a further step in which a field strength of the external magnetic field is changed such that at least one of said nucleation of magnetic domains in the magnetic layer (102) and said rotation of magnetizations of magnetic domains in the magnetic layer (102) occurs.

6. The method according to claim 5, wherein, in the further step, the external magnetic field is changed such that said nucleation of magnetic domains in the magnetic layer (102) occurs.

7. The method according to claim 1, wherein the magnetization loop of the magnetic layer (102) comprises another part in which a change of the magnetization of the magnetic layer (102) due to the changing of the applied external magnetic field predominantly occurs through at least one of a nucleation of magnetic domains in the magnetic layer (102) and a rotation of magnetizations of magnetic domains in the magnetic layer (102), wherein the step of applying the external magnetic field comprises domain wall assisted transport steps in which one or more domain walls in the magnetic layer (102) move under the influence of the applied external field so as to transport the magnetic fluid or the at least one magnetic particle using a magnetic interaction between the magnetic fluid or the at least one magnetic particle and said one or more domain walls in the magnetic layer (102), and further steps in which a field strength of the external magnetic field is changed such that at least one of said nucleation of magnetic domains in the magnetic layer (102) and said rotation of magnetizations of magnetic domains in the magnetic layer (102) occurs, and wherein the domain wall assisted transport steps and the further steps take place alternatingly.

8. The method according to claim 1, wherein in the domain wall assisted transport step, the external magnetic field applied is a magnetic gradient field.

9. The method according to claim 1, wherein the external magnetic field is an alternating magnetic field.

10. The method according to claim 9, wherein the alternating magnetic field is a magnetic gradient field and a gradient of a strength of the external magnetic field has a same orientation in both alternations of the alternating magnetic field.

11. The method according to claim 1, wherein the magnetic fluid (104) or the at least one magnetic particle (509, 510, 604, 700) is paramagnetic or superparamagnetic.

12. The method according to claim 1, wherein the at least one magnetic particle is functionalized, the method further comprising binding a biomolecule to the at least one magnetic particle to detect the biomolecule.

13. A method of transporting a magnetic fluid (104) or at least one magnetic particle (509, 510, 604, 700) using one or more domain walls that separate adjacent magnetic domains in a magnetic layer (102) the method comprising the steps of:

applying an external magnetic field to the magnetic layer (102), a component of the external magnetic field in a plane of the magnetic layer (102) having a gradient at a location of the one or more domain walls;

wherein the step of applying the external magnetic field comprises at least one gradient driven transport step in which the external magnetic field applied is a magnetic gradient field and at least one magnetic particle (604, 700) or at least some of the magnetic fluid is moved by a force exerted on it by the magnetic gradient field, and wherein, in the gradient driven transport step, the external magnetic field is applied to the magnetic layer (102) with a field strength sufficient to make the one or more domain walls vanish.

14. The method according to claim 13, wherein the gradient driven transport step comprises a first gradient driven transport step, in which the force exerted on the magnetic fluid (104) or the at least one magnetic particle (604, 700) by the magnetic gradient field overcomes a force of a magnetic interaction between the magnetic fluid (104) or the at least one magnetic particle (604, 700) and the one or more domain walls, and a second magnetic transport step in which the external magnetic field is applied to the magnetic layer (102) with a field strength sufficient to make the one or more domain walls vanish.

15. The method according to claim 14, wherein the method further comprises a step following the second magnetic transport in which an external magnetic field is applied to the magnetic layer (102) with a field strength smaller than that of the external magnetic field applied in the second magnetic transport step such that the one or more domain walls that had previously vanished reappear.

16. The method according to claim 1, wherein the magnetic layer (102) has magnetic domains with remanent magnetic moments, and wherein the external magnetic field extends in parallel to the remanent magnetic moments of at least some magnetic domains of the magnetic layer (102).

17. The method according to claim 1, wherein the magnetic layer (102) has adjacent magnetic domains that have oppositely oriented remanent magnetic moments.

18. The method according to claim 13, wherein the magnetic layer (102) is an exchange bias system.

19. A device for transporting a magnetic fluid (104) or at least one magnetic particle (509, 510, 604, 700), the device comprising:

- a magnetic layer (102) with an asymmetric re-magnetization property, pinned magnetic domains, or an artificial pattern of magnetic domains, wherein the magnetic layer (102) can magnetically interact with the magnetic fluid (104) or the at least one magnetic particle (509, 510, 604, 700), and wherein the magnetic layer (102) is an exchange bias system; and
- a magnetic field source for applying an external magnetic field to the magnetic layer.

20. The device according to claim 19, wherein the magnetic layer (102) comprises pinned magnetic domains.

21. The device according to claim 19, wherein the magnetic layer (102) has adjacent magnetic domains that have oppositely oriented remanent magnetic moments.

22. The device according to claim 19, wherein the magnetic layer (102) has magnetic domains, and wherein a remanent magnetization of the magnetic domains of the magnetic layer (102) is parallel to an orientation of the external magnetic field.

23. The device according to claim 19, wherein the magnetic layer (102) has magnetic domains with remanent magnetic moments, and wherein the external magnetic field extends in parallel to the remanent magnetic moments of at least some of the magnetic domains.

24. The device according to claim 19, wherein the device further comprises a substrate (800) comprising the magnetic layer (102) and comprising barriers (801) separated by a gap and arranged to form a particle sieve through which particles transported by the device and having a diameter smaller than a size of the gap can be sieved.

25. A method of transporting a magnetic fluid (104) or at least one magnetic particle (509, 510, 604, 700), the method comprising the steps of:

- providing a magnetic layer (102) with pinned magnetic domains or an artificial pattern of magnetic domains;
- placing the magnetic fluid (104) or the at least one magnetic particle (509, 510, 604, 700) in a vicinity of the magnetic layer (102) so that it can magnetically interact with the magnetic layer (102); and
- applying an external magnetic field, wherein the step of applying the external magnetic field comprises a domain wall assisted transport step in which one or more domain walls of the pinned magnetic domains or the magnetic domains of the artificial pattern of magnetic domains move under the influence of the applied external field, so as to transport the magnetic fluid or the at least one magnetic particle using a magnetic interaction between the magnetic fluid or the at least one magnetic particle and said one or more domain walls in the magnetic layer (102).

26. The method according to claim 25, wherein the magnetic layer (102) has an asymmetric re-magnetisation property.

27. The method according to claim 25, wherein, in the domain wall assisted transport step, a field strength of the external magnetic field is increased at least until the one or more domain walls in the magnetic layer (102) vanish.

28. The method according to claim 25, wherein the magnetic domains of the magnetic layer (102) are stripe domains.

29. The method according to claim 25, wherein the magnetic layer (102) is an exchange bias system.

* * * * *